United States Patent [19]
Risman

[11] 3,839,616
[45] Oct. 1, 1974

[54] METHOD AND DEVICE FOR PRODUCING HEATING OF MOISTURE-CONTAINING OBJECTS

[75] Inventor: Per Olov Risman, Tenhult, Sweden

[73] Assignee: Husqvarna Vapenfabriks Aktiebolag, Huskvarna, Sweden

[22] Filed: Feb. 13, 1973

[21] Appl. No.: 332,144

[30] Foreign Application Priority Data
Feb. 14, 1972 Sweden................ 1752/72

[52] U.S. Cl............. 219/10.55, 200/61.06, 338/34
[51] Int. Cl........................ H05b 9/06, H01c 13/00
[58] Field of Search............. 219/10.55; 338/34; 200/61.06

[56] References Cited
UNITED STATES PATENTS

| | | | |
|---|---|---|---|
| 3,185,809 | 5/1965 | Bohm et al. | 219/10.55 |
| 3,255,324 | 6/1966 | Ovshinsky | 338/34 X |
| 3,467,804 | 9/1969 | Smith | 219/10.55 |
| 3,470,942 | 10/1969 | Fukada et al. | 219/10.55 |

FOREIGN PATENTS OR APPLICATIONS

| | | | |
|---|---|---|---|
| 1,090,798 | 10/1960 | Germany | 219/10.55 |

Primary Examiner—J. V. Truhe
Assistant Examiner—Hugh D. Jaeger
Attorney, Agent, or Firm—Holman & Stern

[57] ABSTRACT

A method for the periodic heating of a moisture-containing object is disclosed whereby the change in humidity of the moisture, liberated when the object is heated, is measured by a measuring process and converted to a measuring quantity which controls the heating power fed to the object; a device is also disclosed for carrying out the method.

4 Claims, 3 Drawing Figures

3,839,616

3,839,616

METHOD AND DEVICE FOR PRODUCING HEATING OF MOISTURE-CONTAINING OBJECTS

BACKGROUND OF THE INVENTION

The present invention relates to a method for periodic heating of water-containing objects, in which the heat is added and the moisture removed. The method can be used to prevent boiling or overheating in certain parts of the object most exposed to the heating. The method has advantages, especially for heating in a micro-wave oven, which is equipped with a device for application of the method.

When heating sensitive substances, such as foodstuffs, the risk of overheating is obvious, and can result in certain parts of the object being burned or dried out. This risk was previously noted and partially eliminated by control of the addition of heat, for example the division of the heating time into periods with full power, separated by intervals with no power. Such a control can be produced with the aid of a timer with repeating unit. Such a division of the heating into certain time periods, however, has drawbacks, the period of time having to be adapted to the substance which is to be heated. It must therefore be considered that there is an urgent need for a heating method in which the substance itself provides an indication of how the periodicity in the heating is to be, in order to avoid overheating. Since the water-containing substance gives off steam as it is heated, and therefore the air flowing from the heating place is moist, a control of the addition of heat can be arranged in such a way that the humidity of the air flowing out is measured, and the quantity measured is used to influence contact devices which close and open the circuit as a function of the humidity of the air, and hence of the evaporation from the heated object. But the problem is not completely solved; it is inescapable that the moisture in the ambience around the object, and the heating place, is a slow "reagent" at the temperature of the object in question. Moreover, the measuring equipment must be well calibrated and free of contamination, which raises a number of practical obstacles to a solution of the problem, depending merely on the humidity of the air.

SUMMARY OF THE INVENTION

A better way of solving the reading of the temperature of the object is to measure changes in humidity, that is to say, the derivative of the humidity, in the air flowing around the heating place. Because the absolute humidity of the air rises in discrete jumps as the boiling begins, and the boiling starts at a certain temperature, it is possible, by measuring the humidity derivative, to obtain a quick and reliable jump at the time during the heating of the object when the boiling point is reached. Moreover, in such a method of measurement, the influence of the temperature of the air, and of impurities on the indicator are eliminated, which means that any errors in calibration of the measuring system will have little effect on the precision of measurement.

With the method, a known indicator for measurement of the humidity of the air can be used. Such indicators form part of previously known coupling systems for measuring absolute and relative humidity in the air. The moisture-sensitive substance in such an indicator is composed of a salt, for example lithium chloride, which has the property of increasing its electrical conductivity as the water absorption in the substance is increased. The principle of using a lithium chloride cell's resistance as a gauge of the moisture in the air around the cell, and the measurement, and transformation of the measured values into a humidity figure is therefore known from such coupling systems.

BRIEF DESCRIPTION OF THE DRAWINGS

Further clarification of the method according to the invention will be found in the following description of a practical embodiment of the same in connection with the description of a device shown in the attached drawing for production of periodic heating according to the invention. The drawing shows:

In FIG. 2 a diagrammatic sketch of an indicator used in the device, and in

DETAILED DESCRIPTION OF A PREFERRED EMBODIMENT

Figure 1:
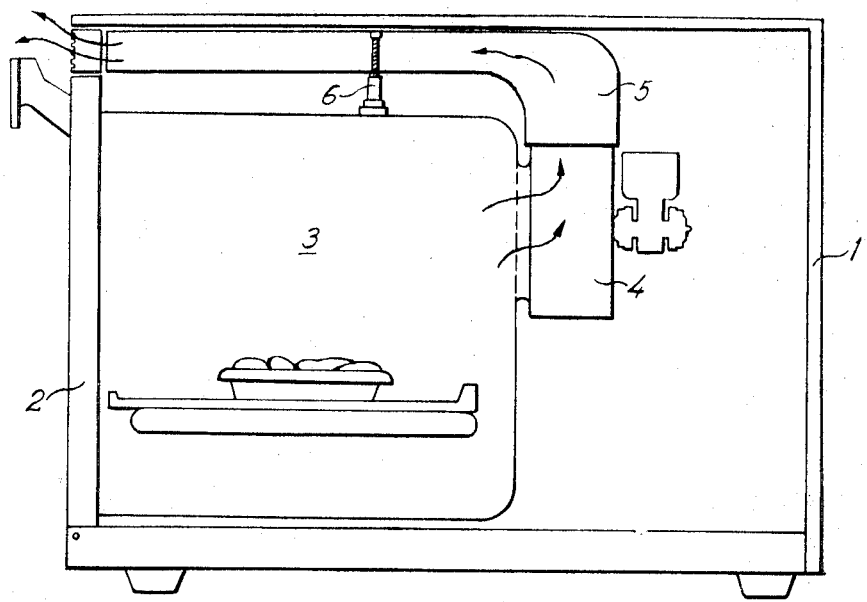
In FIG. 1, an oven for heating objects, equipped with a device according to the invention.

FIG. 1 shows, schematically, a micro-wave oven in longitudinal section, equipped with a case 1, a lid 2 and an oven space 3 which is ventilated with the aid of a fan 4, placed on the back of the oven, which fan draws air from the oven chamber and blows the latter out as the arrows indicate, through a channel 5 under the top of the oven. In this channel there is an indicator element 6 mounted in the airflow from the fan.

Figure 2:
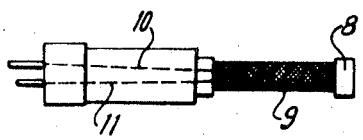

The construction of element 6 is shown in FIG. 2. Over a cylindrical container 8 of temperature-resistant plastic, a piece of glass fiber hose 9 is fitted. The hose 9 is made of untreated, glass fiber heated to incandescence, which can absorb water by capillary force. The diameter of the container is about 6mm when the glass fiber hose is fitted. The length of the hose, when it fits tightly around the holder, is about 30mm. Bifilar silver wires 10, 11 are wound on the glass fiber hose. Each wire is wound for a total of 6–7 turns. The glass fiber hose is impregnated with a 20 percent LiCl solution which subsequently assumes hydroscopic equilibrium with the humidity of the air.

The indicator 6 is supplied with AC without DC components, otherwise electrolysis can arise. When the power is switched on, the indicator 6 first constitutes an almost perfect short-circuit. But it is quickly heated up by the current, and, in the present case, after about one minute, it assumes such a high temperature after the solution dries up, that the current drops to zero. If the indicator is exposed to an air current, however, the "swingover," that is to say the drying up, is of short duration. After another few minutes the indicator temperature stabilizes at a temperature which is a direct function of the partial pressure of the water vapor in the air. This temperature normally lies 20°–30° above the air temperature. In order to maintain this temperature difference, a certain indicator current is required, in normal cases, in a stationary state, 15–30 m.a., if the indicator voltage is about 24 volts AC.

The reason for this self-regulating property is the extraordinarily good hydrophilic properties of lithium chloride; this substance is probably the most hydrophilic of all substances, apart from those which change chemically as they absorb water. The salt can therefore never dry out as long as it is not heated, the temperature of equilibrium is precisely the drying-out temperature. On drying out, however, the electrical conductivity drops so that the current is reduced and the temperature begins to drop.

When the indicator 6 is exposed to an increase in air humidity at constant speed, in the ambient air, it is quickly saturated, and the indicator current consequently rises. But the indicator is heated thereby and the current gradually drops to approximately the same value as before. The indicator current consists, therefore, of two components, on the one hand a "basic component" corresponding to the stationary humidity and the air speed, and on the other hand a "dynamic" component which depends on the changes in humidity, that is, the derivature of the humidity with respect to time. The temperature also changes, very often at the same time as the humidity is changed, but because the indicator temperature is quite high even in the stationary state, this influence is dominated completely by the influence of changes in the humidity.

As an example, it can be stated that if water is heated with about 1 kw of electricity, the indicator current in a few seconds, as boiling begins, rises to more than 200 m.a., provided that the suction fan as shown in FIG. 1 is used. After about 20 minutes, the current has dropped to below 100 m.a.

Figure 3:
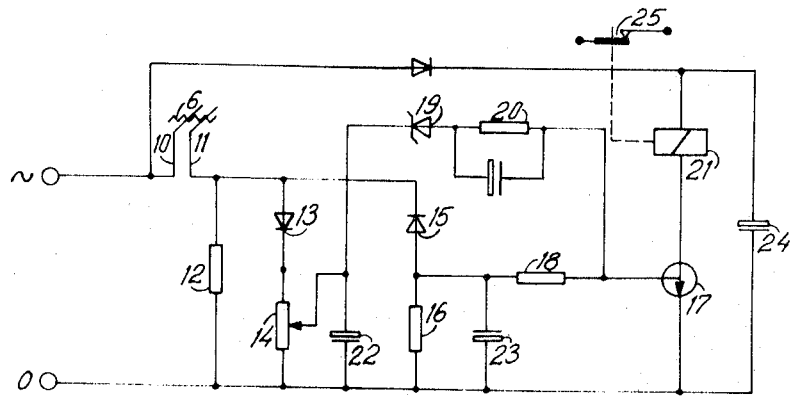
FIG. 3, a hookup in which the indicator forms a part of the device.

As mentioned above, the indicator unit forms part of a circuit of electrical components according to the diagram in FIG. 3. The following is a description of this circuit. Indicator element 6, with feedleads 10, 11 is in series with a resistance 12 connected to a source of AC. In parallel with the resistance there is an amplifier circuit, which includes two branches containing rectifier 13, potentiometer 14 and rectifier 15, respectively, and resistance 16, with rectification in each direction. A current flows through resistance 16, during the negative half cycle of the voltage, and this negative voltage through the resistance is fed to the base of a transistor 17 via another resistance 18, hence the transistor is non-conductive. The base of the transistor is also connected to a branch of the circuit which contains a Zener diode 19 and a resistance 20, and is fed from potentiometer 14. The positive voltage through the latter is applied to the Zener diode 19. Because the resistance in resistance 20 is relatively low, the voltage at the base will rise when the indicator current and hence the voltage across the resistance 12 rises. Since a negative current is flowing through resistance 18, a stronger current through 20 will be required, so that the base current will be strong enough for relay 21 to draw. This compensation means that the working current through the Zener diode, when the relay operates, will be on the straight part of the Zener characteristic, and not the current "knee," hence a faster relay function is obtained. Potentiometer 14 is used for adjustment of the operation of the relay for a desired indicator current. Condenser 22-24 are smoothing condensers. Relay 21 has a contact 25 which forms part of the feed circuit to the oven and hence cuts off the power supply when the relay draws. When the indicator current drops, the relay falls back again, and contact 25 again closes the circuit.

Because indicator element 6 is mounted in the airflow channel as shown in FIG. 1, a favorable control of the switching on and switching off of the oven is obtained. Two factors contribute to reducing the influence of impurities such as grease etc., in the evacuated air. First of all, the indicator current has a "basic component" which need not necessarily come from the lithium chloride, but can result from impurities. In connection with this, we may point out that the quantity of lithium chloride in the indicator is not critical. Secondly, the indicator temperature is higher than the air temperature, which considerably reduces the deposition of impurities on the indicator. Electrolytically conductive impurities generally dry up so that their influence is eliminated.

In a microwave oven, the temperature of the evacuated air is low in comparison with the use of conventional sources of heat. Because the changes in the indicator current are dependent on changes in the temperature and humidity, an indesirable influence of air temperature changes, as boiling begins in the object, is limited. As boiling begins, the absolute humidity in the evacuation air is changed considerably, hence the rise of indicator current will be very substantial; the size of the object therefore plays a very small part, provided that the water content is sufficiently high. Even the fact that the microwave power, and hence the absolute boiling speed, is very little dependent on the size of the object, contributes toward making the adjustment of indicator current for disconnection, non-critical.

Even though the device described here is constituted as a form of regulator of the power to a microwave oven, other fields of application are not, of course, excluded. One field related to that described here would be temperature control of chemical processes. It is naturally possible to vary the device accordingly to the field of use in question. The indicator cell and hookup just described for obtaining control current to a contactor must therefore be considered as an example of execution of a device according to the invention. The method of construction of the device and the device as such are defined in the following claims.

What is claimed is:

1. A method for applying periodic microwave heating to a moisture-containing object comprising the steps of:

a. heating the object to liberate moisture;
   b. measuring the changes in humidity caused by the liberated moisture;
   c. converting the measured changes to a first measuring quantity;
   d. cutting off the heat supplied to the object using said first measuring quantity whereby the object begins to cool;
   e. measuring the consequent changes in humidity liberated from the object;
   f. converting the measured consequent changes to a second measuring quantity;
   g. resupplying heat to the object utilizing said second measuring quantity to thereby increase the humidity liberated from the object; and
   h. continuously repeating steps (b) through (g) to thereby apply periodic heating to the moisture-containing object.

2. A device for producing periodic microwave heating of a moisture-containing object comprising:

a heating chamber; microwave heating means having a power feed circuit and disposed in said chamber; fan means arranged to be in interworking relationship with said chamber; a moisture-sensitive resistance means disposed in close proximity to the object and mounted so as to be in the path of the airstream produced by said fan means, which airstream contains the moisture liberated by the object when heated by said heating means, said moisture-sensitive resistance means being operatively responsive to the moisture in the air-stream for periodically controlling the power fed to said heating means.

3. A device as claimed in claim 2 wherein said moisture-responsive resistance means is composed of a lithium chloride cell with two electrodes.

4. A device as claimed in claim 3 wherein said lithium chloride cell is connected to an amplifier coupling comprising a transistor controlling a relay in the power feed circuit to said heating means, said transistor being set into conduction by a control current produced by a circuit containing a Zener diode, said Zener diode being fed by a voltage through a resistance connected in series with said moisture-sensitive means.

* * * * *